United States Patent
Borghese et al.

(10) Patent No.: US 12,073,729 B2
(45) Date of Patent: Aug. 27, 2024

(54) MACHINE-LEARNED OPERATING SYSTEM AND PROCESSOR

(71) Applicant: Rockwell Collins, Inc., Cedar Rapids, IA (US)

(72) Inventors: John W. Borghese, Cedar Rapids, IA (US); Ryan M. Murphy, Marion, IA (US); Ella M. Atkins, Ann Arbor, MI (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 650 days.

(21) Appl. No.: 17/241,436

(22) Filed: Apr. 27, 2021

(65) Prior Publication Data

US 2022/0343770 A1 Oct. 27, 2022

(51) Int. Cl.
*G08G 5/00* (2006.01)
*B64C 39/02* (2023.01)
*G06N 20/00* (2019.01)

(52) U.S. Cl.
CPC ......... *G08G 5/0039* (2013.01); *B64C 39/024* (2013.01); *G06N 20/00* (2019.01); *B64U 2201/10* (2023.01)

(58) Field of Classification Search
CPC ..... G08G 5/0039; G06N 20/00; B64C 39/024
USPC .......................................................... 701/3
See application file for complete search history.

(56) References Cited

U.S. PATENT DOCUMENTS

| | | | | |
|---|---|---|---|---|
| 10,679,509 | B1* | 6/2020 | Yarlagadda | G08G 5/0039 |
| 10,871,576 | B2* | 12/2020 | Nirula | G01S 19/52 |
| 11,353,889 | B1* | 6/2022 | Freiheit | G06N 20/00 |
| 11,577,859 | B1* | 2/2023 | Howard | G06N 3/006 |

(Continued)

FOREIGN PATENT DOCUMENTS

| | | |
|---|---|---|
| CN | 108897608 A | 11/2018 |
| CN | 109144716 A | 1/2019 |

(Continued)

OTHER PUBLICATIONS

Clainche et al., Improving aircraft performance using machine learning: A review, 2023 Aerospace Science and Technology, pp. 1-28 (pdf).*

(Continued)

*Primary Examiner* — Manglesh M Patel
(74) *Attorney, Agent, or Firm* — Suiter Swantz IP

(57) ABSTRACT

A computing device may include operational processors, configured to execute a set of program instructions, wherein the set of program instructions is configured to cause the operational processors to: receive input signals indicative of input conditions; determine input conditions based input signals; determine output signals based on the determined input conditions; and provide determined output signals. The computing device may further include machine-learning processors, wherein the machine-learning processors are configured to develop machine-learning analyzers, wherein the machine-learning analyzers are configured to: identify operational parameters of the operational processors; determine modifications to the set of program instructions, wherein the modifications satisfy a selected quality metric; and provide the modifications to the operational processors.

11 Claims, 3 Drawing Sheets

(56) References Cited

U.S. PATENT DOCUMENTS

| | | | | |
|---|---|---|---|---|
| 2015/0106313 | A1* | 4/2015 | Eklund | G06N 3/02 |
| | | | | 706/21 |
| 2017/0283085 | A1* | 10/2017 | Kearns | G06Q 50/30 |
| 2018/0089591 | A1* | 3/2018 | Zeiler | G06F 3/048 |
| 2018/0346151 | A1* | 12/2018 | Sturlaugson | G06N 20/20 |
| 2019/0102957 | A1* | 4/2019 | Huber | G06Q 10/20 |
| 2019/0317737 | A1* | 10/2019 | Metsch | G06N 20/00 |
| 2020/0079532 | A1* | 3/2020 | Rix | B64D 45/00 |
| 2020/0115066 | A1* | 4/2020 | De Munck | G06N 20/00 |
| 2020/0134368 | A1* | 4/2020 | Chopra | G01C 23/005 |
| 2020/0134369 | A1* | 4/2020 | Chopra | B64D 45/00 |
| 2020/0134370 | A1* | 4/2020 | Chopra | G06N 20/00 |
| 2020/0180788 | A1* | 6/2020 | Hanov | G05B 23/0283 |
| 2020/0202723 | A1* | 6/2020 | Pierre | G08G 5/0052 |
| 2020/0234165 | A1* | 7/2020 | Wang | G06N 20/20 |
| 2020/0327392 | A1* | 10/2020 | Bleiweiss | G06N 3/08 |
| 2020/0369410 | A1* | 11/2020 | Rice | G06N 20/00 |
| 2020/0372682 | A1* | 11/2020 | Kim | G06N 3/08 |
| 2021/0065003 | A1* | 3/2021 | Chen | G09B 9/42 |
| 2021/0110302 | A1* | 4/2021 | Nam | G06N 5/01 |
| 2021/0116982 | A1* | 4/2021 | Khanna | G06F 1/3287 |
| 2021/0180891 | A1* | 6/2021 | Rousselet | G05B 13/0265 |
| 2021/0181694 | A1* | 6/2021 | Lillestolen | G06N 20/10 |
| 2021/0199685 | A1* | 7/2021 | Tucker | G01P 5/26 |
| 2021/0365778 | A1* | 11/2021 | Dey | G01S 13/505 |
| 2021/0371123 | A1* | 12/2021 | List | B64D 31/06 |
| 2021/0383706 | A1* | 12/2021 | Gibbons, II | G07C 5/0808 |
| 2022/0028287 | A1* | 1/2022 | Durant | G06N 20/00 |
| 2022/0306314 | A1* | 9/2022 | Buhro | G06F 16/248 |
| 2023/0348045 | A1* | 11/2023 | List | B64C 19/00 |
| 2023/0368009 | A1* | 11/2023 | Howell | G05B 23/024 |
| 2023/0377466 | A1* | 11/2023 | Hernandez | G08G 5/0091 |

FOREIGN PATENT DOCUMENTS

| | | | | |
|---|---|---|---|---|
| EP | 3663211 A1 | * | 6/2020 | B64F 5/40 |
| IN | 202047054509 A | | 12/2020 | |
| WO | 2019245571 A1 | | 12/2019 | |

OTHER PUBLICATIONS

Chenxi Sun et al., A multi-model architecture based on deep learning for aircraft load prediction, Jul. 18, 2023, doi.org, pp. 1-12.*

Aida Sharif Rohani et al., Machine Learning Approach for Aircraft Performance Model Parameter Estimation for Trajectory Prediction Applications, 2023 IEEE, pp. 1-9 (pdf).*

Richard Alligier et al., Machine Learning and Mass Estimation Methods for Ground-Based Aircraft Climb Prediction, Dec. 2015, IEEE, vol. 16, No. 6, pp. 3138-3149.*

Dias, Siddharth et al., "A Machine Learning Approach for Improving Process Scheduling: A Survey", International Journal of Computer Trends and Technology (IJCTT), vol. 43, No. 1, Jan. 2017, 5 pages.

https://www.quora.com/Is-it-possible-to-use-machine-learning-to-optimize-algorithms-in-an-operating-system-For-example-deciding-what-data-will-be-brought-to-the-the-page-cache-which-virtual-addresses-to-save-in-the-TLB-etc, Downloaded Jan. 21, 2021, 11 pages.

Negi, Atul et al., "Applying Machine Learning Techniques to Improve Linux Process Scheduling", Department of Computer and Information Sciences, 2007, DOI 10.1109/TENCON.2005.300837, 6 pages.

Ojha, Prakhar et al., "Learning Scheduler Parameters for Adaptive Preemption", Computer Science and Information Technology (CS & IT), 2007, DIO 10.5121/csit.2015.51513, 14 pages.

Rehaiem, Ghofrane et al., "New Optimal Solutions for Real-Time Scheduling of Operating System Tasks based on Neural Networks", 2017, DOI Reference No. 10.18293/SEKE2017-027, 7 pages.

Zhang, Yu et al., "Self-Learning Disk Scheduling", IEEE Transactions on Knowledge and Data Engineering, vol. 21, No. 1, Jan. 2009, 16 pages.

* cited by examiner

MACHINE-LEARNED OPERATING SYSTEM AND PROCESSOR

BACKGROUND

As mission-critical avionics processing systems continue to require updates to keep pace with changing technology, the time and effort required to develop and implement such updates increases significantly. In some cases, development and implementation time can result in significant cost and downtime. For example, for some mission-critical avionics computing systems, development and implementation may require several years of testing, verification, and reprogramming of mission-critical operating systems and processors. Therefore, a machine-learned operating system and processor configured to provide continuous processor improvement and quicker update implementation may be desirable.

SUMMARY

A computing device is disclosed, in accordance with one or more embodiments of the present disclosure. In on embodiment, the computing device includes one or more operational processors, wherein the one or more operational processors are configured to execute a set of program instructions, wherein the set of program instructions is configured to cause the one or more operational processors to: receive one or more input signals indicative of one or more input conditions; determine one or more input conditions based on the one or more input signals; determine one or more output signals based on the one or more determined input conditions; and provide one or more determined output signals. In another embodiment, the computing device includes one or more machine-learning processors, wherein the one or more machine-learning processors are configured to develop one or more machine-learning analyzers, wherein the one or more machine-learning analyzers are configured to: identify one or more operational parameters of the one or more operational processors; determine one or more modifications to the set of program instructions, wherein the one or more modifications satisfy a selected quality metric; and provide the one or more modifications to the one or more operational processors.

A method is disclosed, in accordance with one or more embodiments of the present disclosure. In one embodiment, the method includes identifying one or more operational parameters of one or more operational processors. In another embodiment, the method includes determining one or more modifications to set of program instructions of the one or more operational processors, wherein the one or more modifications satisfy a selected quality metric. In another embodiment, the method includes providing the one or more modifications to the one or more operational processors.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
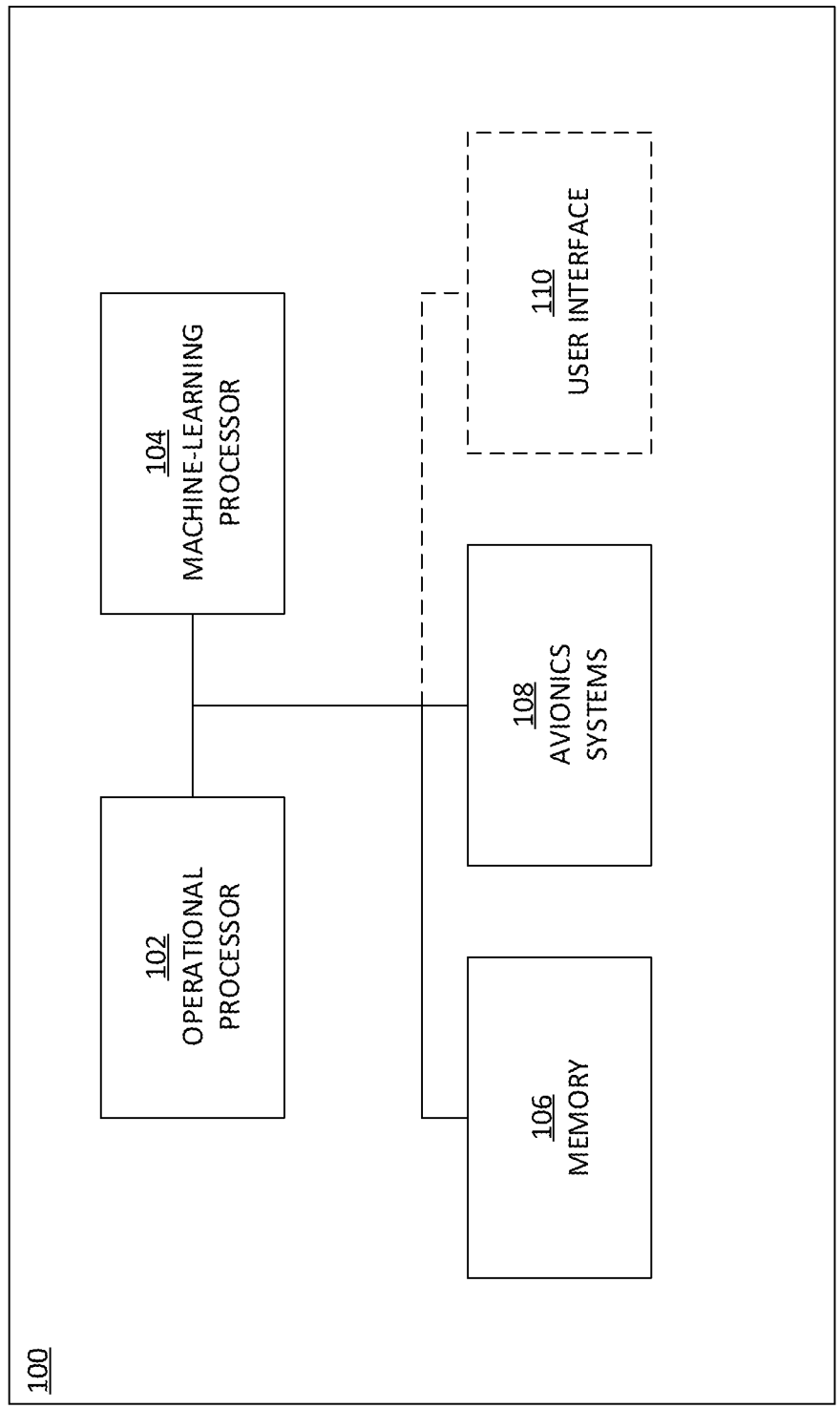
FIG. 1 is a block diagram illustration of a computing device, in accordance with one or more embodiments of the present disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Generally, embodiments of the inventive concepts disclosed herein are directed to a machine-learned operating system and processor configured to provide continuous processor improvement and quicker update implementation. The system and processor improve mission computer updates by reducing downtime and by eliminating certain aspects of implementation, including, without limitation, embedded software and firmware porting. Embodiments of the system are configured to allow continuous processor improvement without investment in and replacement of mission computing processors.

The embodiments of the present disclosure generally relate to mission computing devices configured for use in aerial vehicles and unmanned aerial vehicles. Aerial vehicles and unmanned vehicles include avionics systems configured to control various aspects of flight and related operations. Avionics systems include systems that are configured to measure certain aspects of the environment in which an aircraft is operating (e.g., altitude, air speed, heading, or the like). Avionics systems frequently include reprogrammable elements (e.g., processors and/or controllers configured to control their functions in view of changing operational mission requirements, threats, or changes in or modifications to aircraft equipment. The reprogrammable elements (e.g., processors and/or controllers) may be housed within individual avionics systems, or may comprise a central mission computer.

Avionics systems may include an operational flight program (OFP) and/or a real-time operating system (RTOS) stored in memory and configured to be hosted by one or more processors. Each of the OFP and the RTOS may be configured to process and/or control various aspects of the operation of the avionics systems. OFPs and RTOSs are frequently configured to operate on various architectures and interfaces, including, without limitation, PowerPC and x86 architectures. However, updates to aspects of OFPs and RTOSs hosted on PowerPC and x86 architectures may prove to be expensive and time-consuming in that reprogramming such architectures often requires manual revisions to software code, testing, and implementation.

Existing methods of reprogramming (e.g., updating) reprogrammable elements often require extensive development, testing, certification, and implementation time, and therefore cause significant downtime, each of which may affect mission readiness.

The embodiments of the present disclosure generally relate to mission computing devices having one or more machine-learning processors configured to develop one or more machine-learning analyzers.

FIG. 1 is a block diagram illustration of a computing device 100, in accordance with one or more embodiments of the present disclosure. The computing device 100 may include an operational processor 102. The operational processor 102 may be configured to execute a set of program instructions. The set of program instructions may be stored in a memory unit 106 communicatively coupled to the operational processor 102. The set of program instructions may include one or more elements of an OFP or an RTOS.

The operational processor 102 may be configured to receive one or more signals indicative of one or more input conditions from one or more avionics systems 108. For example, the one or more avionics systems 108 may be configured to provide to the operational processor 102 one or more signals indicative of an input condition within an environment in which the aircraft is traveling. By way of another example, an input condition may include any data or measurement related to flight or flight systems of the aircraft, including, without limitation, air speed, altitude, heading, radar data, mission systems data, weapons systems data, or the like. The one or more avionics systems 108 may be disposed on or in an aircraft or at a location remote to the aircraft. The one or more avionics systems 108 may be communicatively coupled to the operational processor 102 via any wireless or wireline connection known in the art such that a signal indicative of the measured input condition may be communicated to the operational processor 102.

Upon receipt of the one or more signals indicative of the one or more input conditions, the operational processor 102 may be configured to determine the one or more input conditions based on the one or more input signals indicative of the one or more input conditions. For example, the operational processor 102 may be configured to determine the one or more input conditions by applying a known formula to the one or more input signals or by comparing the one or more input signals indicative of the one or more input conditions to a database of known input signals.

Upon determination of the one or more input conditions, the operational processor 102 may be configured to determine one or more corresponding output signals based on the one or more determined input conditions. For example, upon determination of an input condition, the operational processor 102 may be configured to determine an appropriate response (e.g., modification to one or more aspects of measurement of the avionics systems 108, provision of an alert to a user interface 110, or the like). It is noted that the operational processor 102 may be configured to first determine an appropriate response to a determined input condition and then determine an appropriate output signal corresponding to such appropriate response such that the appropriate response may be executed by a downstream component of the computing device 100 or a component of another avionics, flight, or computer system.

The operational processor 102 may be configured to provide the determined appropriate output signal to one or more downstream and/or upstream components of the computing device 100 or a component of another avionics, flight, or computer system. For example, the operational processor 102 may be configured to provide the determined appropriate output signal to the one or more avionics systems 108.

In some embodiments, the computing device 100 may include a machine-learning processor 104. The machine-learning processor 104 may be configured to develop one or more machine-learning analyzers and to store the machine-learning analyzers in the memory unit 106. The one or more machine-learning analyzers may include any machine-learning or deep-learning classifier known in the art, including, without limitation, a random forest classifier, a support vector machine (SVM) classifier, an ensemble learning classifier, an artificial neural network (ANN), or the like. By way of another example, the machine learning classifier may include a deep convolutional neural network (CNN). In this regard, the machine learning classifier may include any algorithm, classifier, or predictive model, including, without limitation, any algorithm, classifier, or predictive model configured to perform the operations described herein. In some embodiments, the machine learning classifier may comprise a neural network having multiple layers and receptors.

The one or more machine-learning analyzers may be configured to identify one or more operational parameters of the one or more operational processors 102. For example, the one or more machine-learning analyzers may be configured to identify parameters related to the function of an RTOS or an OFP. In this regard, the one or more machine-learning analyzers may be configured to identify one or more parameters of the operational processors 102 that are related to task performance of the one or more operational processors. By way of example, the one or more operational parameters of the one or more operational processors may include, without limitation, accuracy and/or integrity of processing outputs (e.g., determinations made by the operational processors 102), processing time, power and/or resource consumption for processing functions, or the like.

It is noted that the one or more machine-learning analyzers may be configured to predict the one or more operational parameters using machine learning such that the machine-learning processor 104 may allow for improvement in task performance of the operational processors 102.

Upon identification of the one or more operational parameters of the one or more operational processors 102, the one or more machine-learning analyzers may be configured to determine one or more modifications to the set of program instructions. For example, the one or more machine-learning analyzers may be configured to determine one or more modifications to the set of program instructions, wherein the one or more modifications may be configured to cause the set of program instructions to improve the operational performance of the one or more operational processors 102. By way of another example, the one or more modifications may be configured to cause the one or more operational processors 102 to be configured for different mission settings. By way of yet another example, the one or more modifications may be configured to increase the accuracy and/or integrity of processing outputs.

In some embodiments, the one or more modifications may be configured and/or selected by the one or more machine-learning analyzers such that the one or more modifications and/or the operational improvements caused by the one or more modifications satisfies a selected quality metric. For example, the selected quality metric may require a maximum error rate with respect to the operational performance of the one or more operational processors 102 upon implementation of the one or more modifications. In this regard, the one or more modifications may include modifications to the set of program instructions that have a maximum allowable error threshold. As an example, the maximum allowable error threshold may be a threshold determined by the maximum number of errors allowable per operation. For instance, the maximum allowable error threshold may be configured to allow an average of $10^{-5}$ errors per operation.

The one or more machine-learning analyzers may be configured to provide the one or more modifications to the one or more operational processors 102. For example, the one or more machine-learning analyzers may provide the one or more modifications to the one or more operational processors 102 (or a component of the one or more operational processors 102 or a component coupled to the one or more operational processors 102, such as memory 106) such that the one or more operational processors 102 may execute the set of program instructions, wherein the set of program instructions is modified by the one or more modifications.

It is noted that the embodiments of the present disclosure are not limited to separate operational processor 102 and machine-learning processor 104. For example, though not shown, the computing device 100 may include a singular processor configured to perform the functions of the operational processor 102 and the machine-learning processor 104 as described herein.

The various components of the present disclosure (e.g., the one or more operational processors 102, the one or more machine-learning processors 104, memory 106, the avionics systems 108, and the user interface 110) may be communicatively coupled to each other via one or more methods known in the art.

Each of the one or more operational processors 102 and the one or more machine-learning processors 104 may include any one or more processing elements known in the art. In general, the term "processor" may be broadly defined to encompass any device having one or more processing elements, which execute program instructions from a non-transitory memory medium. In one embodiment, the one or more operational processors 102 may include any microprocessor-type computational device configured to execute software algorithms and/or instructions. The one or more operational processors 102 may be embodied in, or consist of, a personal computer system, a mobile device (e.g., tablet, smart phone, laptop, etc.), embedded computer system, mainframe computer system, workstation, image computer, parallel processor, a networked computer, or any other computational device known in the art. In general, the term "computational device" may be broadly defined to encompass any device having data processing or logic capabilities. It should be recognized that the steps described throughout the present disclosure may be carried out by a single controller or, alternatively, multiple controllers. The one or more machine-learning processors 104 may include any computational device configured to carry out machine-learning and/or deep-learning processors. For example, the one or more machine-learning processors 104 may include any graphic or neuromorphic processor known in the art to be suitable for the purposes contemplated herein.

The memory 106 may include any storage medium known in the art suitable for storing program instructions executable by the associated one or more processors and/or for storing one or more sets of measurement data, one or more sets of information, and/or one or more databases acquired from the various components and sub-systems of the herein described invention. For example, the memory 106 may include, but is not limited to, random access memory (RAM), read-only memory (ROM), or a persistent store, such as a mass storage device, hard drives, CDROM, DVDROM, tape, erasable programmable read-only memory (EPROM or flash memory), any magnetic, electromagnetic, solid state, infrared, optical, or electrical system, apparatus or device for storing information, or any other type of media suitable for storing electronic data.

In some embodiments, the computing device 100 may include one or more user interfaces 110. For example, the user interface 110 may include a display and/or a user input device. the display 148 includes any display device known in the art. The display may include, but is not limited to, a liquid crystal display (LCD). By way of another example, the display device may include, but is not limited to, an organic light-emitting diode (OLED) based display. By way of another example, the display device may include, but is not limited to a CRT display. Those skilled in the art should recognize that a variety of display devices may be suitable for implementation in the present disclosure and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present disclosure.

In one embodiment, the user input device includes any user input device known in the art. For example, user input device may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a control wheel, a throttle, a joystick, a bezel input device or the like. In the case of a touchscreen interface, those skilled in the art should recognize that a large number of touchscreen interfaces may be suitable for implementation in the present disclosure. For instance, the display may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present disclosure. In another embodiment, the user input device may include, but is not limited to, a bezel mounted interface.

Figure 2:
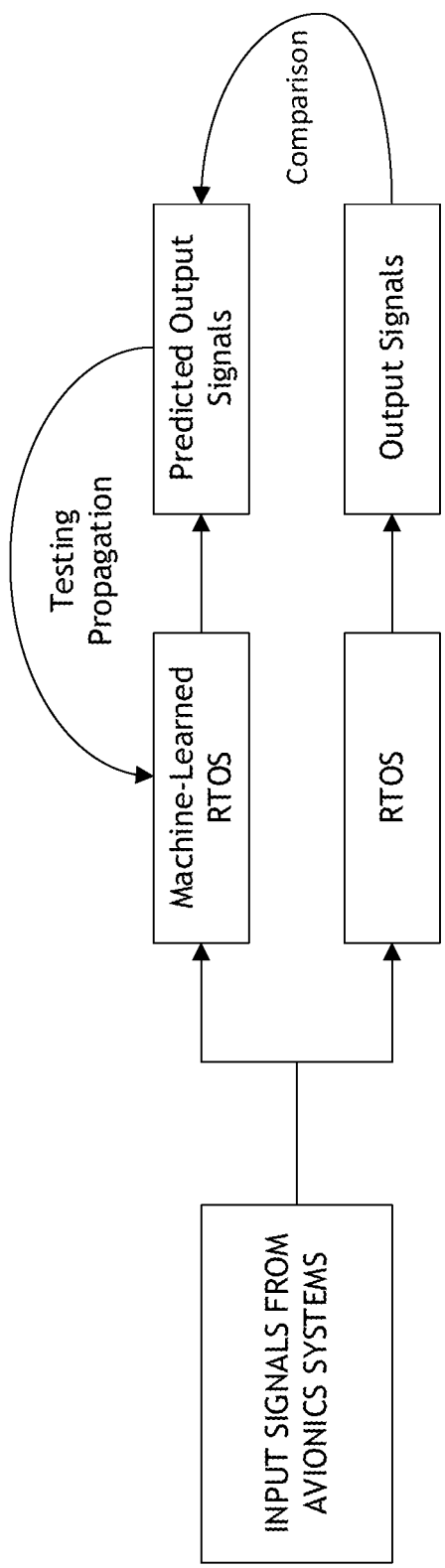
FIG. 2 is a conceptual illustration of one or more operations of a computing device, in accordance with one or more embodiments of the present disclosure.

FIG. 2 is a conceptual illustration of one or more operations of a computing device, in accordance with one or more embodiments of the present disclosure. In some embodiments, each of the one or more operational processors 102 and the one or more machine-learning processors 104 may receive one or more input signals indicative of one or more input conditions (e.g., from the one or more avionics systems 108).

As previously described, the one or more operational processors 102 may be configured, upon receipt of the one or more input signals, to determine the one or more input conditions based on the one or more input signals indicative of the one or more input conditions, determine one or more corresponding output signals based on the one or more determined input conditions, and provide the determined appropriate output signal to one or more downstream and/or upstream components of the computing device 100 or a component of another avionics, flight, or computer system. In some embodiments, the one or more operational processors 102 may be configured to perform each of the foregoing processes using an RTOS.

The one or more machine-learning processors 104 may be configured to develop and/or train the one or more machine-learning analyzers based on the one or more input signals. For example, as shown in FIG. 2, the one or more machine-learning processors 104 may include a machine-learned RTOS configured as an analogue of the RTOS used by the one or more operational processors 102. The machine-learned RTOS may be configured to perform the same functions as the RTOS in a virtual environment (e.g., in a non-production environment). In this way, the machine-learned RTOS may be configured to determine the one or more input conditions based on the one or more input signals indicative of the one or more input conditions and determine one or more predicted output signals based on the one or more determined input conditions. It is specifically contemplated that the one or more operational processors 102 may be configured to determine and provide the one or more output signals contemporaneously with the determination by the one or more machine-learning processors 104 of the one or more predicted output signals.

In some embodiments, the one or more machine-learning processors 104 may be configured to compare the predicted output signals to the output signals determine by the one or more operational processors 102. For example, the one or more machine-learning processors 104 may be configured to determine an accuracy and/or integrity of the predicted output signal relative to the determined output signal.

In some embodiments, the one or more machine-learning processors 104 may be configured to perform one or more testing and/or propagation processes with respect to the determination of the predicted output signals. For example, the one or more machine-learning processors 104 may be configured to test a predicted output signal (e.g., by comparison against the output signals determined by the one or more operational processors 102) for integrity and/or accuracy. By way of another example, the machine learning analyzers may be configured to collect data (e.g., output signals, predicted output signals) during one or more operations and store such data (e.g., in memory 106) so that it may be used during the testing and/or propagation processes (e.g., the one or more machine-learning processors 104 may be configured to test a predicted output signal against stored, previously determined output signals). The machine learning analyzers may be configured to extract one or more predictable aspects of such collected data and apply the extracted predictable aspects to one or more input signals. For example, the machine-learning analyzers may be configured to predict an appropriate output signal based on one or more predictable aspects of an input signal.

It is specifically contemplated that, during the testing process, the one or more machine-learning processors 104 may apply a selected quality metric such that the machine learning analyzers are able to predict a predicted output signal satisfying the selected quality metric. For example, the one or more machine-learning processors 104 may be configured to develop and/or train machine learning analyzers capable of predicting a predicted output signal within an allowable error threshold. In this regard, the one or more machine-learning processors 104 may be configured to repeatedly propagate the testing process until the predicted output signal falls within the allowable error threshold.

The machine-learned RTOS may be configurable to perform one or more functions in a testing environment. For example, the machine-learned RTOS may be configured such that the machine learning analyzers may be used to test an effect of one or more changes to the RTOS implemented by the one or more operational processors 102. In this regard, the machine-learned RTOS (and the machine learning analyzers) may be configured to rapidly identify operational impacts that may result from the implementation of one or more changes to the RTOS implemented by the one or more operational processors 102 (e.g., the effects of such a change on the operational parameters of the operational processors 102) prior to implementation. It is contemplated that the use of the machine-learned RTOS for at least the foregoing purpose may reduce downtime during software changes and upgrades. It is further contemplated that the use of the machine-learned RTOS for at least the foregoing purpose may reduce certification time, and may increase operational efficiency, even in view of ever-changing mission objectives and/or requirements.

Figure 3:
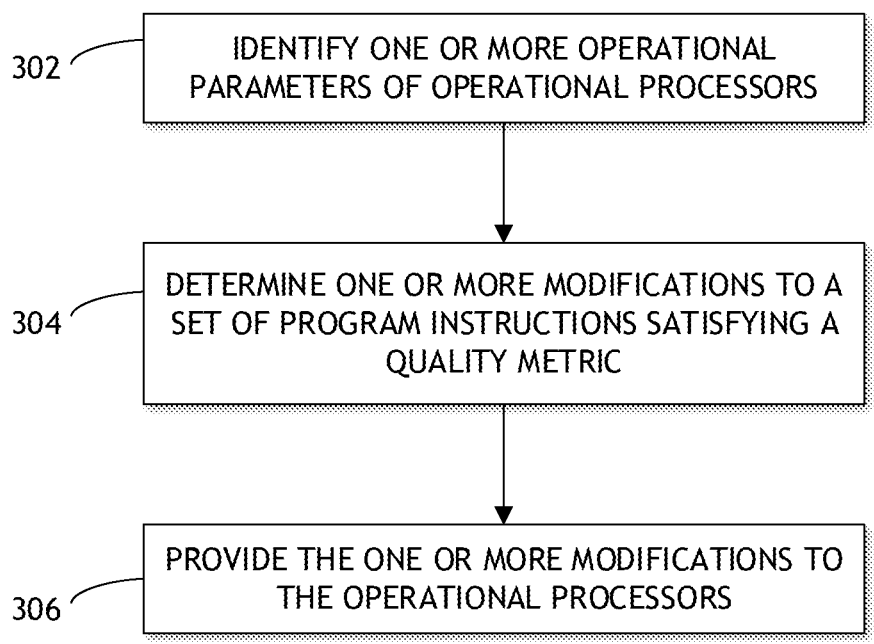
FIG. 3 is a process flow diagram illustrating an exemplary embodiment of a method of operation of a computing device, in accordance with one or more embodiments of the present disclosure.

FIG. 3 is a process flow diagram illustrating an exemplary embodiment of a method 300 of operation of a computing device 100, in accordance with one or more embodiments of the present disclosure.

In Step 302, one or more operational parameters of one or more operational processors are identified. For example, the one or more machine-learning analyzers of the one or more machine-learning processors 104 may be configured to identify one or more operational parameters of the one or more operational processors 102. As another example, the one or more machine-learning analyzers may be configured to identify parameters related to the function of an RTOS or an OFP. In this regard, the one or more machine-learning analyzers may be configured to identify one or more parameters of the operational processors 102 that are related to task performance of the one or more operational processors. By way of another example, the one or more operational parameters of the one or more operational processors may include, without limitation, accuracy and/or integrity of processing outputs (e.g., determinations made by the operational processors 102), processing time, power and/or resource consumption for processing functions, or the like. It is noted that the one or more machine-learning analyzers may be configured to predict the one or more operational parameters using machine learning such that the machine-learning processor 104 may allow for improvement in task performance of the operational processors 102.

In Step 304, one or more modifications to a set of program instructions is determined, wherein the one or more modifications satisfy a selected quality metric. For example, upon identification of the one or more operational parameters of the one or more operational processors 102, the one or more machine-learning analyzers may be configured to determine one or more modifications to the set of program instructions. For example, the one or more machine-learning analyzers may be configured to determine one or more modifications to the set of program instructions, wherein the one or more modifications may be configured to cause the set of program instructions to improve the operational performance of the one or more operational processors 102. By way of another example, the one or more modifications may be configured to cause the one or more operational processors 102 to be configured for different mission settings. By way of yet another example, the one or more modifications may be configured to increase the accuracy and/or integrity of processing outputs.

In some embodiments, the one or more modifications may be configured and/or selected by the one or more machine-learning analyzers such that the one or more modifications and/or the operational improvements caused by the one or more modifications satisfies a selected quality metric. For example, the selected quality metric may require a maximum error rate with respect to the operational performance of the one or more operational processors 102 upon implementation of the one or more modifications. In this regard, the one or more modifications may include modifications to the set of program instructions that have a maximum allowable error threshold. As an example, the maximum allowable error threshold may be a threshold determined by the maximum number of errors allowable per operation. For instance, the maximum allowable error threshold may be configured to allow an average of $10^{-5}$ errors per operation.

In Step 306, the one or more modifications are provided to the one or more operational processors. For example, the one or more machine-learning analyzers may be configured to provide the one or more modifications to the one or more operational processors 102. For example, the one or more machine-learning analyzers may provide the one or more modifications to the one or more operational processors 102 (or a component of the one or more operational processors 102 or a component coupled to the one or more operational processors 102, such as memory 106) such that the one or more operational processors 102 may execute the set of program instructions, wherein the set of program instructions is modified by the one or more modifications.

As will be appreciated from the above, systems and methods according to embodiments of the inventive concepts disclosed herein may optimize the startup process by minimizing the loading of identical runtime images from slower solid-state data storage and promoting instead the much faster copying of identical runtime images from system RAM.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A computing device, comprising:
a user interface;
one or more operational processors, wherein the one or more operational processors are configured to execute a set of program instructions, wherein the set of program instructions is configured to cause the one or more operational processors to:
receive one or more input signals indicative of one or more input conditions, wherein the one or more input conditions comprise an altitude, an air speed, and a heading;
determine the one or more input conditions based on the one or more input signals;
determine one or more output signals based on the one or more determined input conditions, wherein the one or more output signals comprise an alert; and
provide the one or more output signals to the user interface; and
one or more machine-learning processors, wherein the one or more machine-learning processors are configured to develop one or more machine-learning analyzers, wherein the one or more machine-learning analyzers are configured to:
determine one or more predicted output signals based on the one or more input conditions;
identify one or more operational parameters of the one or more operational processors, wherein the one or more operational parameters comprise an accuracy of the one or more predicted output signals relative to the one or more output signals;
determine one or more modifications to the set of program instructions, wherein the one or more modifications satisfy a selected quality metric; and
provide the one or more modifications to the one or more operational processors such that the one or more operational processors execute the set of program instructions with the one or more modifications, wherein the one or more modifications increase the accuracy.

2. The computing device of claim 1, wherein the computing device comprises an avionics processing system.

3. The computing device of claim 2, wherein the one or more input signals are provided to the one or more operational processors via one or more avionics systems.

4. The computing device of claim 3, wherein the one or more input conditions comprise one or more conditions measured by the one or more avionics systems.

5. The computing device of claim 4, wherein the set of program instructions comprises at least one of an operational flight program or a real-time operating system.

6. The computing device of claim 5, wherein the one or more modifications to the set of program instructions are configured to modify the set of program instructions such that the set of program instructions is configured to update one or more aspects of an operation of the one or more operational processors.

7. The computing device of claim 6, wherein the computing device comprises a mission computer of at least one of an aerial vehicle or an unmanned aerial vehicle.

8. The computing device of claim 1, wherein the one or more machine-learning processors comprise one or more neuromorphic processors.

9. The computing device of claim 1, wherein the one or more machine-learning analyzers comprise at least one of a deep learning classifier, a convolutional neural network, or an artificial neural network.

10. The computing device of claim 1, further comprising one or more memory units.

11. The computing device of claim 10, wherein each of the set of program instructions and the one or more machine-learning analyzers is stored in the one or more memory units.

* * * * *